Jan. 15, 1957        F. MENZEL        2,777,984
ELECTRICAL GENERATOR REGULATOR
Filed July 15, 1953        2 Sheets-Sheet 1
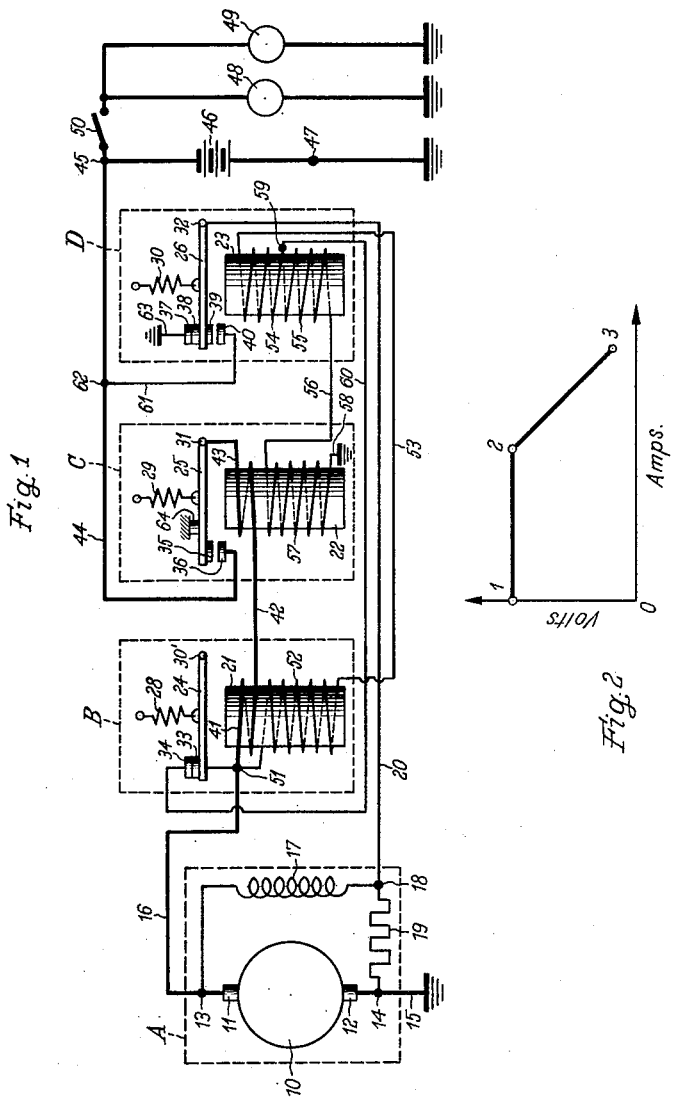
INVENTOR:
FRIEDRICH MENZEL
BY:

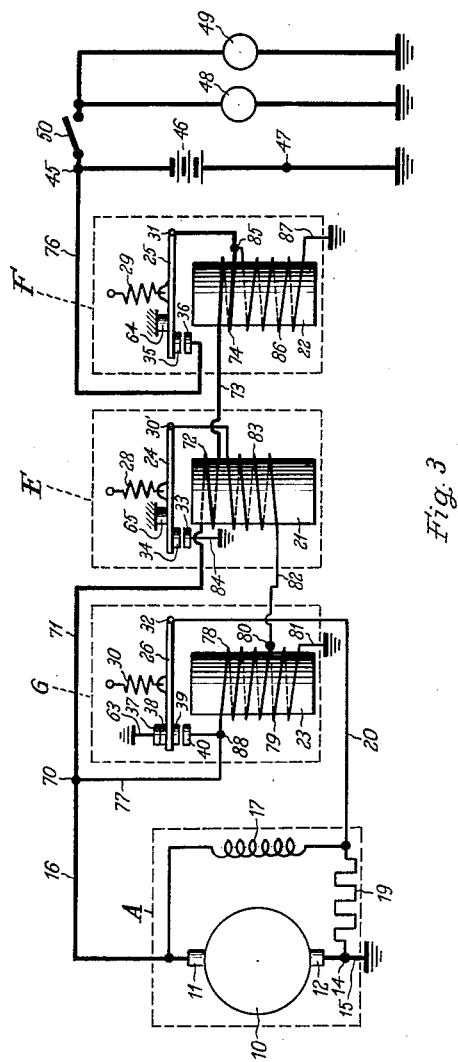

United States Patent Office 2,777,984
Patented Jan. 15, 1957

2,777,984
ELECTRICAL GENERATOR REGULATOR
Friedrich Menzel, Stuttgart, Germany
Application July 15, 1953, Serial No. 368,031
5 Claims. (Cl. 322—25)

The invention relates to electrical regulation and, more particularly, to a novel electro-magnetically operated circuit controlling structure for use as a combined voltage regulation and current decreasing means.

It is an object of the present invention to provide an electrical regulation of simple design.

It is a further object of the invention to provide an electrical regulation for controlling and particularly decreasing the current of a power source in a predetermined manner when a certain amperage is reached.

It is a still further object of the invention to provide a regulation not affected by outside vibrations.

It is a still further object of the invention to provide a regulating arrangement adapted to be mounted on the generator of a motor-car, said generator to be regulated by the arrangement.

With these objects in view, the invention consists, in combination, of a regulating relay means, a first energizing shunt coil, a second energizing shunt coil, both coils being cumulatively arranged on said regulating relay means, at least one pair of cooperating vibratory contact elements provided on said regulating relay means, a control relay means, a series control coil, a shunt control coil, both coils being subtractively arranged on said control relay means, a pair of cooperating contact elements provided on said control relay means, the connection being such that operation of the control contact elements tends to increase the ampere turns of the regulating relay means and to decrease the ampere turns of the control relay means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a diagrammatic view of a first embodiment of the invention;

Fig. 2 is a voltage-current diagram of a generator regulated by the regulating arrangement according to the invention; and Fig. 3 a diagrammatic view of a second embodiment of the invention.

In Fig. 1 A is a generator of the D. C. shunt type, which may be driven by the engine of an automobile at variable speed. The generator comprises an armature 10 with two brushes 11 and 12 connected to the terminals 13 and 14, the latter being connected to ground by a conductor 15 and the former to a conductor 16. A field 17 of the generator A is connected with its one end to terminal 13 and with its other end at junction 18 to an ohmic resistance 19 whose other end is connected to terminal 14. Connected to junction 18 is a conductor 20.

Conductors 16 and 20 connect the generator A with three relays, i. e. a control relay B, an automatic switch C and a regulating relay D, which will now be described.

The three relays are controlled by electromagnets having cores 21, 22 and 23 respectively, which attract the armatures 24, 25 and 26 respectively against the force of springs 28, 29 and 30 respectively, the armatures being pivoted at 30', 31 and 32 respectively.

At the end of armature 24 a contact point 33 is attached which is forced against a stationary contact 34 by spring 28 when the control relay B is deenergized. At the end of armature 25 a contact point 35 is fixed opposite of which a stationary contact point 36 is arranged, both contact points not touching each other when switch relay C is deenergized, because spring 29 urges contact point 35 away from contact point 36, with the movement of armature 25 being limited by an insulated stop means 64. Armature 26 of regulating relay D is provided with two contact points 38 and 39 on either side, with a stationary contact point 37 arranged opposite contact point 38 and a stationary contact point 40 opposite contact point 39, the action of spring 30 being such that contact points 37 and 38 are closed when relay D is deenergized.

Conductor 16 connects with a series coil 41 arranged on core 21 and a conductor 42 connects coil 41 with series coil 43 provided on core 22, the end of coil 43 being attached to pivot 31 of armature 25. Contact point 36 is connected by conductor 44 to a terminal 45 of a battery 46 whose other terminal 47 is connected to ground. Connected in parallel to the battery 46 are lamps 48 and 49 designating the load to be supplied, a switch 50 serving to cut the lamps in or out as desired.

Connected at junction 51 to the series coil 41 is a shunt coil 52 arranged on core 21, the other end of coil 52 being connected by conductor 53 to a shunt coil 54 provided on core 23. The other end of coil 54 is connected at junction 59 to a second shunt coil 55 arranged on core 23 whose other end is connected by conductor 56 to a shunt coil 57 wound on core 22, the other end of said coil 57 being connected to ground at 58. Contact point 34 is connected to junction 59 by conductor 60. Conductor 61 connects contact point 40 to a junction 62 of conductor 44 and contact point 37 is grounded at 63.

The operation of the system shown in Fig. 1 is as follows:

When generator A is driven by an automobile engine, voltage will be generated. As contact points 38 and 37 are closed junction 18 is grounded through conductor 20, armature 26, contact points 38 and 37. A comparatively small current will also flow through field 17, resistance 19 to ground. The voltage generated will cause a current to flow through conductor 16, junction 51, armature 24, closed contact points 33 and 34, conductor 60, shunt coil 55, conductor 56, shunt coil 57 to ground at 58, while no current is flowing in the other shunt coils and series coils. Thus switch relay C and regulating relay D are energized. At a certain predetermined voltage exceeding somewhat that of the battery, core 22 of switch relay C will attract armature 25 whereupon the contact points 35 and 36 will close. Now a current may also flow from the generator A through conductor 16, series coil 41, conductor 42, series coil 43, armature 25, contact points 35 and 36, line 44 to battery 46 or lamps 48, 49 when switch 50 is closed. When the speed of generator A rises still further so that the voltage tends to increase, armature 26 of regulating relay D will under the action of coil 59 be attracted by core 23 with the result that the contact of contact points 38 and 37 will be broken. Now junction 18 is no longer directly connected to ground, so that the field current is forced to solely flow through the ohmic resistance 19 to ground. Thus the field current will decrease and also the voltage generated, whereupon the contact points 37 and 38 will close again. This will cause the armature 26 to vibrate at a high frequency opening and closing these points in a manner well known in the art. When the speed of the generator A is so increased that the voltage produced with the resistance 19 in series with field 17 is raised by a further small increment, the armature 26 will be pulled further down through the increased magnetic force, whereupon contact points 39 and 40 will be closed with the result that field 17 is short circuited. Now armature 26 will vibrate in such a manner that contact points 39 and 40 are made and broken.

In spite of the arrangement described so far, it may happen that the total current supplied by the generator A exceeds a certain predetermined maximum value, with the result that the generator A is overloaded and might get damaged. This is prevented by the action of control relay B magnetized by the action of series coil 41. When armature 24 is attracted by core 21 at a certain predetermined current, the contact points 34 and 33 are broken, with the result that the shunt coils 52, 54, 55 and 57 are all connected in series. The coils 54 and 55 arranged on core 23 act cumulatively and are so dimensioned that the total ampere turns will now exceed the ampere turns produced by the action of coil 55 alone, with the result that relay D operating at a fixed number of ampere turns will regulate at a lower voltage level than before, whereby the voltage generated will decrease accordingly. The voltage drop may be determined as desired by proper selection of the coils, e. g. in such a manner that the power generated by generator A will remain constant from point 2 to 3 and never exceed the maximum power permissible.

In order to have the contact points 33 and 34 vibrate so that stable conditions will exist, shunt coil 52 is wound on core 21 in such a manner that its action is subtractive to series coil 41. Thus the contact points 33 and 34 will close again upon energizing coil 52, which occurs after breaking of contact points 33 and 34, with the result that armature 24 will vibrate at high frequency, thereby making and breaking contact points 33 and 34. The higher the amperage in series coil 41 the greater the action of control relay B so that the regulating voltage of regulating relay D is continuously lowered.

The voltage-current diagram is shown in Fig. 2. While the voltage generated with contact points 33 and 34 of control relay B closed will be constant as shown by line 1—2, the voltage will drop upon opening of contact points 33 and 34 along line 2—3, point 2 illustrating the moment when relay B comes into action.

When the generator voltage is reduced below battery voltage series coil 43 will disconnect the generator A from the battery at a predetermined current in a manner well known in the art.

In Fig. 3 a second embodiment of the invention is illustrated. A designates a generator having the same denotations as in Fig. 1. The three relays employed in this embodiment, i. e. a control relay E, an automatic switch F and a regulating relay G are, as regards their cores, contact points, armatures and springs similar to those described in connection with Fig. 1 and are denoted by the same numerals. There is, however, one difference in as much as the contact points 33 and 34 of control relay E are open when this relay is not energized, an insulating stop means 65 limiting the movement of armature 24 when the latter is at rest.

In the following the hookup of the relays will be described in detail.

A conductor 71 connects junction 70 with a series coil 72 arranged on core 21 and a conductor 73 connects the latter coil with a series coil 74 on core 22, the other end being connected to pivot 31. A conductor 76 connects contact point 36 to junction 45.

A conductor 77 connects junction 70 to junction 88 to which contact point 40 is connected. Arranged on core 23 are two shunt coils 78 and 79 connected in series at junction 80, the other end of coil 78 being connected to junction 88 and of coil 79 to ground at 81. Conductor 82 connects junction 80 to a shunt coil 83 whose other end is connected to pivot 30. Contact point 33 is grounded at 84. At 85 a shunt coil 86 is connected to series coil 74, the other end of shunt coil 86 being grounded at 87.

The operation of the system shown in Fig. 3 is as follows:

When generator A is operated, the voltage generated will cause a current to flow through conductor 16, conductor 71, series coil 72, series coil 74 to junction 85 and from there through the shunt coil 86 to ground at 87. Also, a current will flow from junction 70, conductor 77, junction 88, shunt coil 78, shunt coil 79 to ground at 81. Thus both relays F and G are energized. At a certain predetermined voltage exceeding somewhat that of battery 46, core 22 of switch relay F will attract armature 25, whereupon contact points 35 and 36 will close. Now a current may flow from generator A through conductor 16, conductor 71, series coil 72, conductor 73, series coil 74, armature 25, contact points 35, 36, conductor 76 to junction 45 and from there to battery 46 and lamps 48 and 49 when switch 50 is closed. When the speed of generator A rises still further so that the voltage tends to increase beyond a predetermined value armature 26 of regulating relay G will be attracted under the action of the two cumulatively acting shunt coils 78 and 79. The voltage regulation will now closely follow the procedure described in connection with Fig. 1.

When the current supplied by generator A exceeds a certain predetermined value armature 24 will be attracted by series coil 72 whereupon contact points 34 and 33 will close, thereby grounding shunt coil 83. Now an additional current will flow from junction 80 through conductor 82, shunt coil 83, armature 24, contact points 34, 33 to ground at 84. This current will increase the current already flowing in coil 78 and thus the total ampere turns of the coils arranged on core 23. For this reason the regulating relay G will regulate at a lower voltage than before. The shunt coil 83 on the other hand is wound in such a manner that it counteracts the ampere turns of series coil 72 thereby causing the contact points 33 and 34 to reopen, with the result that the contact point 34 will vibrate at a high frequency. The action of the control relay E will be such that with increasing current of series coil 72, the voltage of the regulating relay will steadily become lower. The generator is thus operating along line 2—3 of Fig. 2, 2 being the moment when the control relay E starts operating.

As may be seen from the figures in connection with the description, the resistance 19 may be comparatively small due to the short circuiting action of the lower pair of contact elements of the regulating relay. Thus outside vibrations will have a very small effect on the rapidly vibrating contact points of both the regulating and the control relay, as a deflecting of a contact point will affect the voltage generated to a practically negligible degree. Thus it may be possible to mount all relays belonging to a combination according to the invention on the generator controlled by such relays without the vibrations of the generator affecting the action of the relays.

However, the regulating system according to the invention is by no means limited to the type of regulating relay shown and the hookup described, as it may be readily adapted to be used in connection with single-pair regulating relays or other shunt coil connections of the regulating and control relays, achieving by such adaptation the same result, i. e., lowering the current of the supply source at a predetermined amperage in a predetermined manner.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letter Patent is:

1. Apparatus of the character described comprising, in combination, a generator having a shunt field winding in series with a shunt field resistor; a load connected to said generator; automatic switch means connected between said load and said generator, said switch means being open below a predetermined first output voltage level of said generator and automatically closing when said first predetermined voltage level is reached; regulating means including means for short-circuiting said resistor and said field winding respectively for regulating said output voltage of said generator by short-circuiting said resistor until a second predetermined output voltage level is reached which is higher than said first output voltage level, said regulating means tending to maintain the output voltage at said second predetermined output voltage level by alternately opening and closing the short circuit across said resistor while the current produced by said generator increases to a desired value, said regulating means continuing to maintain the output voltage at said second predetermined output voltage level after the desired current value is reached by alternately opening and closing the short circuit across said field winding; and control means operative when said output current of said generator reaches a predetermined value and automatically reducing second predetermined output voltage level in accordance with further increase of said output current.

2. Apparatus of the character described comprising, in combination, a generator having a shunt field winding in series with a shunt field resistor; a load connected to said generator; electromagnetic switch means connected between said load and said generator, said switch means being open below a predetermined first output voltage level of said generator and automatically closing when said first predetermined voltage level is reached; electromagnetic regulating means including means for short-circuiting said resistor and said field winding respectively for regulating said output voltage of said generator by short-circuiting said resistor until a second predetermined output voltage level is reached which is higher than said first output voltage level, said regulating means tending to maintain the output voltage at said second predetermined output voltage level by alternately opening and closing the short circuit across said resistor while the current produced by said generator increases to a desired value, said regulating means continuing to maintain the output voltage at said second predetermined output voltage level after the desired current value is reached by alternately opening and closing the short circuit across said field winding; and electromagnetic control means operative when said output current of said generator reaches a predetermined value and automatically reducing said second predetermined output voltage level in accordance with further increase of said output current.

3. Apparatus of the character described comprising, in combination, a generator; a load connected to said generator; electromagnetic switch means connected between said load and said generator, said switch means being open below a predetermined first output voltage level of said generator and automatically closing when said first predetermined voltage level is reached; electromagnetic regulating means for regulating said output voltage of said generator and becoming operative when a second predetermined output voltage level is reached which is higher than said first output voltage level, said regulating means tending to maintain the output voltage at said second predetermined output voltage level while the current produced by said generator increases; and normally open electromagnetic control means closing when said output current of said generator reaches a predetermined value to increase the amount of current flowing through said regulating means at any fixed generator output voltage and thereby automatically reduce said second predetermined output voltage level in accordance with further increase of said output current.

4. Apparatus of the character described comprising, in combination, a generator; a load connected to said generator; electromagnetic switch means connected between said load and said generator, said switch means being open below a predetermined first output voltage level of said generator and automatically closing when said first predetermined voltage level is reached; electromagnetic regulating means having operative ampere-turns for regulating said output voltage of said generator and becoming operative when a second predetermined output voltage level is reached which is higher than said first output voltage level, said regulating means tending to maintain the output voltage at said second predetermined output voltage level while the current produced by said generator increases; and normally closed electromagnetic control means opening when said output current of said generator reaches a predetermined value to increase the amount of operative ampere-turns of said regulating means at any fixed generator output voltage and thereby automatically reduce said second predetermined output voltage level in accordance with further increase of said output current.

5. Apparatus of the character described comprising, in combination, a generator having a shunt field winding in series with a shunt field resistor; a load connected to said generator; automatic switch means connected between said load and said generator, said switch means being open below a predetermined first output voltage level of said generator and automatically closing when said first predetermined voltage level is reached; electromagnetic regulating means having a winding wound about a core and including a pivotally mounted armature operable between at least a first, an intermediate and a second position in response to the current flowing through said winding, said armature remaining in said first position to short circuit said shunt field resistor until the output voltage of the generator reaches a predetermined level at which time said armature oscillates between said intermediate and first positions to maintain said generator output voltage at said predetermined level, the generator output current through said winding of said regulating means increasing to move said armature into said second position where said field winding is short-circuited, said armature oscillating between said intermediate and said second position until said output current of said generator reaches a predetermined value; and control means operative at said predetermined value of output current to increase the amount of current through said winding for the same output voltage whereby said regulating means tends to maintain the output voltage of said generator at lower levels in accordance with further increase of said output current.

References Cited in the file of this patent

UNITED STATES PATENTS

| | | |
|---|---|---|
| 2,218,109 | Hochstetter | Oct. 15, 1940 |
| 2,339,037 | Thompson | Jan. 11, 1944 |
| 2,339,526 | Thompson | Jan. 18, 1944 |
| 2,556,371 | Hussey | June 12, 1951 |
| 2,617,907 | Umbarger et al. | Nov. 11, 1952 |